(12) United States Patent
Kim et al.

(10) Patent No.: US 8,402,754 B2
(45) Date of Patent: Mar. 26, 2013

(54) APPARATUS FOR PURIFYING EXHAUST GAS

(75) Inventors: Chang Dae Kim, Yongin (KR); Jim Ha Lee, Seoul (KR); Ji Ho Cho, Yongin (KR); Ki Hyung Joo, Seongnam (KR); Jin Woo Choung, Suwon (KR)

(73) Assignee: Hyundai Motor Company, Seoul (KR)

( * ) Notice: Subject to any disclaimer, the term of this patent is extended or adjusted under 35 U.S.C. 154(b) by 528 days.

(21) Appl. No.: 12/276,214

(22) Filed: Nov. 21, 2008

(65) Prior Publication Data

US 2009/0241521 A1 Oct. 1, 2009

(30) Foreign Application Priority Data

Mar. 31, 2008 (KR) ........................ 10-2008-0029862

(51) Int. Cl.
    *F01N 3/00* (2006.01)
(52) U.S. Cl. ........................... 60/297; 60/311
(58) Field of Classification Search ............ 60/287, 60/299, 295, 301, 297, 311
    See application file for complete search history.

(56) References Cited

U.S. PATENT DOCUMENTS

| | | | | |
|---|---|---|---|---|
| 5,458,664 | A * | 10/1995 | Ishii et al. ........................ | 55/282 |
| 6,805,849 | B1 * | 10/2004 | Andreasson et al. ....... | 423/239.1 |
| 7,264,785 | B2 * | 9/2007 | Blakeman et al. ......... | 423/213.2 |
| 2004/0098973 | A1 * | 5/2004 | Tennison et al. .............. | 60/286 |
| 2005/0056004 | A1 * | 3/2005 | Kakwani et al. .............. | 60/286 |
| 2005/0266988 | A1 * | 12/2005 | Doumeki et al. ............. | 502/339 |
| 2006/0057046 | A1 * | 3/2006 | Punke et al. ................ | 423/215.5 |
| 2006/0153761 | A1 * | 7/2006 | Bandl-Konrad et al. .. | 423/239.1 |
| 2006/0156709 | A1 * | 7/2006 | Twigg et al. .................... | 60/278 |
| 2007/0028604 | A1 * | 2/2007 | Twigg et al. .................... | 60/297 |
| 2007/0130919 | A1 * | 6/2007 | Lee ................................. | 60/286 |
| 2007/0189936 | A1 * | 8/2007 | Suwabe et al. ................ | 422/177 |
| 2007/0224093 | A1 | 9/2007 | Miyairi et al. | |
| 2007/0238605 | A1 * | 10/2007 | Strehlau et al. ................ | 502/60 |
| 2007/0248517 | A1 * | 10/2007 | Nagata et al. .............. | 423/213.5 |

FOREIGN PATENT DOCUMENTS

| | | |
|---|---|---|
| DE | 10 2004 040 549 A1 | 2/2006 |
| EP | 0 393 917 A2 | 10/1990 |
| EP | 1 728 984 A2 | 12/2006 |
| EP | 1 728 984 A3 | 12/2006 |
| JP | 2004-138022 A | 5/2004 |
| JP | 2005-226458 A | 8/2005 |
| KR | 1020030034139 A | 1/2003 |
| WO | WO 02/14657 A1 | 2/2002 |
| WO | WO 2007/136753 A2 | 11/2007 |
| WO | WO 2008/121167 A1 | 10/2008 |

* cited by examiner

*Primary Examiner* — Thomas Denion
*Assistant Examiner* — Patrick Maines
(74) *Attorney, Agent, or Firm* — Morgan, Lewis & Bockius LLP

(57) ABSTRACT

An apparatus for purifying exhaust gas may include a CPF device primarily oxidizing hydrocarbon and carbon monoxide in the exhaust gas by using a first DOC, and trapping and regenerating particulate material (PM), a DOC device mounted downstream of the CPF device, secondarily oxidizing the HC and the CO in the primarily oxidized exhaust gas by using a second DOC, and oxidizing nitrogen monoxide into nitrogen dioxide by using the second DOC, a nozzle mounted downstream of the DOC device, and dosing a reducing agent to the exhaust gas secondarily oxidized by the DOC device, and a selective catalytic reduction device mounted downstream of the nozzle, and reducing nitrogen oxide in the exhaust gas into nitrogen gas) by using the $NO_2$ generated in the DOC device and the reducing agent.

13 Claims, 4 Drawing Sheets

(a)

(b)

(c)

APPARATUS FOR PURIFYING EXHAUST GAS

CROSS-REFERENCE TO RELATED APPLICATION

The present application claims priority to Korean Patent Application No. 10-2008-0029862 filed Mar. 31, 2008, the entire contents of which is incorporated herein for all purposes by this reference.

BACKGROUND OF THE INVENTION

1. Field of the Invention

The present invention relates to an apparatus for purifying exhaust gas of vehicles. More particularly, the present invention relates to an apparatus for purifying exhaust gas that reduces hydrocarbon (HC), carbon monoxide (CO), particulate material (PM), and nitrogen oxide ($NO_x$) contained in the exhaust gas.

2. Description of Related Art

Generally, exhaust gas flowing out through an exhaust manifold from an engine is driven into a catalytic converter mounted at an exhaust pipe and is purified therein. After that, the noise of the exhaust gas is decreased while passing through a muffler and then the exhaust gas is emitted into the air through a tail pipe. The catalytic converter is a type of diesel particulate filter (DPF) and purifies pollutants contained in the exhaust gas. A catalytic carrier for trapping particulate material (PM) contained in the exhaust gas is in the catalytic converter, and the exhaust gas flowing out from the engine is purified through a chemical reaction therein.

One type of catalytic converter is a selective catalytic reduction (SCR) apparatus. In the selective catalytic reduction (SCR) apparatus, reducing agents such as carbon monoxide and total hydrocarbon (THC) react better with nitrogen oxide than oxygen. Thus, such a catalytic converter is called a selective catalytic reduction apparatus.

According to a conventional apparatus for reducing nitrogen oxide contained in exhaust gas, a diesel oxidation catalyst (DOC) device oxidizes total hydrocarbon (THC) and carbon monoxide (CO), and oxidizes nitrogen monoxide (NO) into nitrogen dioxide ($NO_2$). After that, an SCR device reduces nitrogen oxides ($NO_x$) into nitrogen gas ($N_2$) by using the $NO_2$ generated in the DOC device and a reducing agent. However, as exhaust gas regeneration (ECR) technology and post injection technology is further applied to vehicles, the THC and the CO contained in exhaust gas increases. In addition, the $NO_2$ generated by oxidizing NO is used in the DOC device when the THC and the CO are oxidized during cool starting. That is, the $NO_2$ is used when the THC and the CO are oxidized at a low temperature.

In addition, if the $NO_2$ is generated in the DOC device, the $NO_2$ is used for regenerating soot in a catalyzed particulate filter (CPF) device disposed at the rear of the DOC device. Equation 1 below represents a soot regeneration reaction performed in the CPF device.

$$C + NO_2 \rightarrow CO/CO_2 + NO \quad \text{Equation 1}$$

Therefore, it is difficult to reduce the $NO_x$ in the exhaust gas according to the conventional apparatus for purifying exhaust gas, since the $NO_2$ generated in the DOC device is firstly used in the CPF device and then a part of the remaining $NO_2$ is supplied to the SCR device.

In addition, since, by applying the EGR technology and the post injection technology to vehicles, the increased THC and CO are oxidized only in the DOC device, and the THC and the CO are not fully oxidized.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an apparatus for purifying exhaust gas having advantages of fully oxidizing HC and CO contained in the exhaust gas and sufficiently reducing $NO_x$ by causing $NO_2$ generated in the oxidation of the HC and the CO to be sufficiently supplied to an SCR device as a consequence of disposing a DOC device between a CPF device and the SCR device.

One aspect of the present invention is directed to an apparatus for purifying exhaust gas that may include a catalyzed particulate filter (CPF) device mounted downstream of an engine, the catalyzed particulate filter (CPF) device firstly oxidizing hydrocarbon (HC) and carbon monoxide (CO) in the exhaust gas by using a first diesel oxidation catalyst (DOC), and trapping and regenerating particulate material (PM), a diesel oxidation catalyst (DOC) device mounted downstream of the CPF device, secondarily oxidizing the HC and the CO in the firstly oxidized exhaust gas by using a second DOC, and oxidizing nitrogen monoxide (NO) into nitrogen dioxide ($NO_2$) by using the second DOC, a nozzle mounted downstream of the DOC device, and dosing a reducing agent to exhaust gas secondarily oxidized by the DOC device, and/or a selective catalytic reduction (SCR) device mounted downstream of the nozzle, and reducing nitrogen oxide ($NO_x$) in the exhaust gas into nitrogen gas ($N_2$) by using the $NO_2$ generated in the DOC device and the reducing agent.

The regeneration of the particulate material (PM) may begin when a pressure difference between an inlet and an outlet of the CPF device is larger than or equal to a predetermined pressure. The predetermined pressure may be between approximately 20 kpa and approximately 30 kpa.

The first DOC may include a noble metal. The noble metal may include platinum (Pt) and palladium (Pd). A ratio of the platinum to the palladium may be approximately 2:1 to approximately 12:1. A loading amount of the noble metal in the first DOC may be larger than or equal to 35 $g/ft^3$.

The second DOC may include a noble metal. The noble metal may include platinum and palladium. A ratio of the platinum to the palladium may be approximately 1:0 to approximately 2:1. A loading amount of the noble metal in the second DOC may be between approximately 10 100 $g/ft^3$ and approximately 100 $g/ft^3$.

The first DOC may oxidize nitrogen monoxide (NO) into the nitrogen dioxide ($NO_2$), and the oxidized nitrogen dioxide may be used for regenerating the particulate material (PM).

The SCR device may include a zeolite-catalyst where transition elements are ion-exchanged. A weight ratio of the transition elements to the zeolite may be approximately 1:4. The transition elements may be copper or iron.

The CPF device may include a first zone-coating portion in which 50-95 wt % of the first DOC is coated, and/or a second zone-coating portion in which 5-50 wt % of the first DOC is coated. Length ratio of the first zone-coating portion to the second zone-coating portion may be between approximately 2:8 and approximately 7:3.

The reducing agent may be ammonia.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
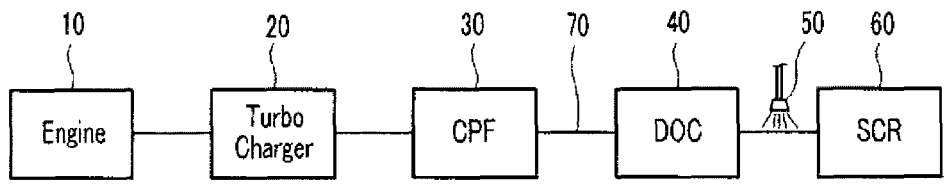
FIG. 1 is a block diagram of an exemplary apparatus for purifying exhaust gas according to the present invention.

FIG. 1 is a block diagram of an apparatus for purifying exhaust gas according to various embodiments of the present invention.

As shown in FIG. 1, exhaust gas generated in an engine 10 flows sequentially through a turbo charger 20, a CPF device 30, and a DOC device 40, past a nozzle 50, and through an SCR device 60, and noxious materials contained in the exhaust gas are removed. The turbo charger 20, the CPF device 30, the DOC device 40, the nozzle 50, and the SCR device 60 are mounted on an exhaust pipe 70.

The engine 10 includes a plurality of cylinders for burning an air-fuel mixture. Each cylinder is connected to an intake manifold so as to receive the air-fuel mixture, and the intake manifold is connected to an intake pipe so as to receive fresh air.

In addition, each cylinder is connected to an exhaust manifold, and the exhaust gas generated in a combustion process is gathered in the exhaust manifold. The exhaust manifold is connected to the exhaust pipe 70.

The turbo charger 20 rotates a turbine by using energy of the exhaust gas, and increases an air drawing amount.

The CPF device 30 is mounted downstream of the turbo charger 20, and includes a first DOC and a catalyst filter (CPF).

The first DOC oxidizes HC and CO in the exhaust gas primarily, and oxidizes NO into $NO_2$. A noble metal including platinum (Pt) and palladium (Pd) is used for the first DOC. In order to effectively perform the first oxidation, a ratio of the platinum and the palladium may be 2:1-12:1 and a loading amount of the noble metal in the first DOC may be larger than or equal to 35 g/ft³. The first DOC removes the HC and the CO from the exhaust gas primarily, and transmits $NO_2$ generated therein to the CPF. The primary oxidation performed in the first DOC is described in the following Equation 2.

$$4HC+3O_2 \rightarrow 2CO_2+2H_2O \qquad \text{Equation 2}$$

$$2CO+O_2 \rightarrow 2CO_2$$

$$2NO+O_2 \rightarrow 2NO_2$$

The first DOC mainly removes the HC and the CO from the exhaust gas and generates the $NO_2$ to a degree that is required only for regenerating soot in the CPF as a consequence of the ratio of the platinum and the palladium in the first DOC being controlled to 2:1-12:1 and the loading amount of the noble metal in the first DOC being controlled to be larger than or equal to 35 g/ft³ according to various embodiments of the present invention.

The CPF traps particulate material ("PM") in the exhaust gas and regenerates the trapped PM (i.e., soot). Soot regeneration begins when a pressure difference between an inlet and an outlet of the CPF device is larger than or equal to a predetermined pressure (about 20-30 kpa). In this case, soot regeneration of Equation 1 proceeds. Since the CPF device 30 is disposed close to the engine 10 in the apparatus for purifying exhaust gas according to various embodiments of the present invention, it is easy to raise the temperature of the exhaust gas to be higher than or equal to a predetermined temperature required for regenerating the soot, i.e., 300° C. In addition, the $NO_2$ generated in the first DOC is used for regeneration of the soot.

Figure 3:
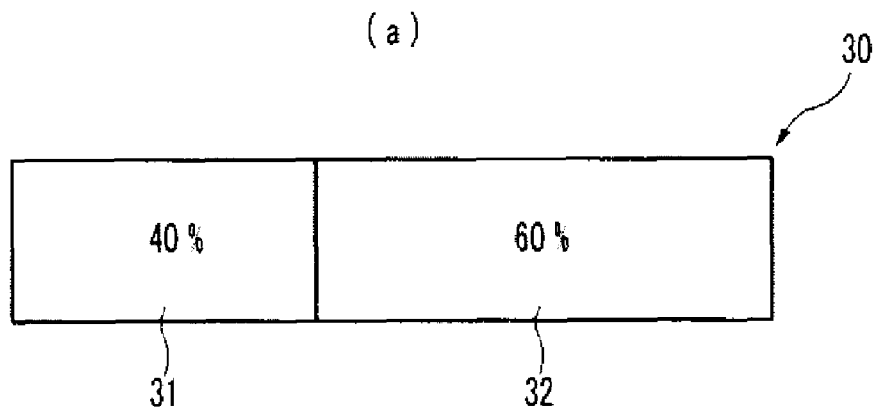
FIG. 3 is a schematic diagram showing examples of a zone-coated first diesel oxidation catalyst in an exemplary apparatus for purifying exhaust gas according to the present invention.
Figure 3:
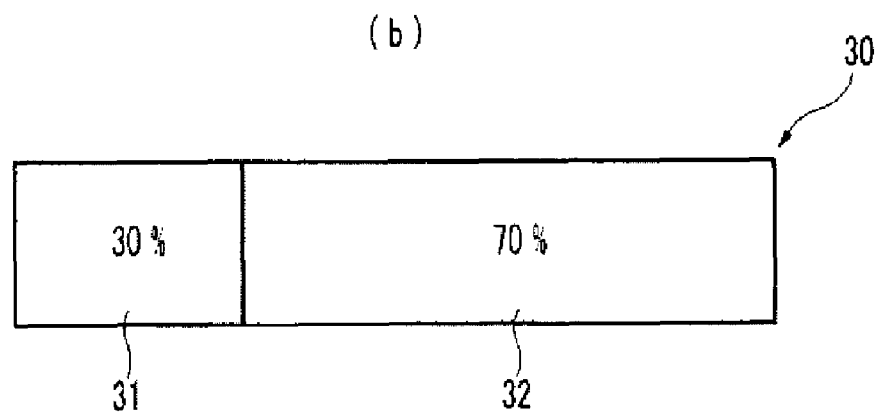
Figure 3:
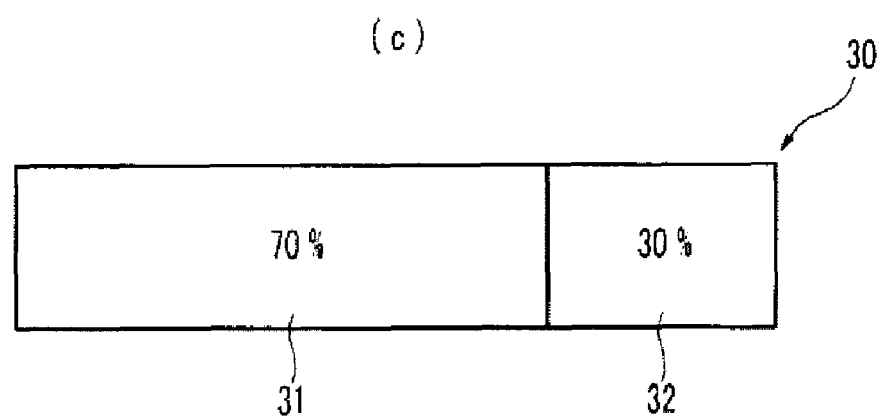

Since the soot is accumulated at a rear portion of the CPF device 30, the primary oxidation hardly occurs at the rear portion of the CPF device 30. Therefore, the first DOC may be zone-coated in the CPF device 30 in order to enhance efficiency of the primary oxidation, as shown in FIG. 3. That is, the CPF device 30 includes a first zone-coating portion 31 in which 50-95 wt % of the first DOC is coated, and a second zone-coating portion 32 in which 5-50 wt % of the first DOC is coated. As shown in FIG. 3, the length ratio of the first zone-coating portion 31 to the second zone-coating portion 32 can be set to any arbitrary value according to performance of the CPF device 30 that one may desire, and may be 2:8-7:3.

The DOC device 40 is mounted downstream of the CPF device 30 and receives the exhaust gas of which the HC and the CO is primarily oxidized and the PM is removed by the CPF device 30. A second DOC is coated in the DOC device 40, and secondarily oxidizes the HC and the CO, and oxidizes the NO into the $NO_2$. In order to effectively generate the $NO_2$, a noble metal including platinum and palladium is used for the second DOC. A ratio of the platinum and the palladium may be 1:0-2:1, and a loading amount of the noble metal in the second DOC may be 10-100 g/ft³.

In order for the $NO_2$ generated in the DOC device 40 to be sufficiently transmitted to the SCR device 60, the DOC device 40 is directly connected to the SCR device 60. The secondary oxidation performed in the second DOC is the same as in Equation 2. Since the ratio of the platinum to the palladium in the second DOC differs from the ratio of the platinum to the palladium in the first DOC, content of oxides generated in the first and second DOCs are different from each other. That is, the first DOC is designed to generate the $NO_2$ required for soot regeneration, and the second DOC is designed to generate the $NO_2$ that can be sufficiently supplied to the SCR device 60.

The nozzle 50 is mounted between the DOC device 40 and the SCR device 60, and doses a reducing agent to the exhaust gas secondarily oxidized in the DOC device 40. The reducing agent may be ammonia. Generally, urea is dosed into the exhaust gas by the nozzle 50 and the urea is decomposed into ammonia.

That is, the urea is decomposed into ammonia ($NH_3$) by Equation 3.

$$(NH_2)_2CO \rightarrow NH_3 + HNCO \quad \text{Equation 3}$$

$$HNCO + H_2O \rightarrow NH_3 + CO_2$$

The exhaust gas mixed with the reducing agent and the $NO_2$ generated in the DOC device 40 are transmitted to the SCR device 60.

The SCIR device 60 is mounted downstream of the nozzle 50, and includes a zeolite catalyst where transition elements are ion-exchanged. In order to effectively reduce the $NO_x$, the transition elements may be copper or iron, and a weight ratio of the transition elements to the zeolite may be 1-4. The SCR device 60 reduces $NO_x$ contained in the exhaust gas into nitrogen gas $N_2$ by using the $NO_2$ generated in the DOC device 40 and the reducing agent so as to reduce the $NO_x$ amount in the exhaust gas.

The reaction performed in the SCR device 60 is described Equation 4 below.

$$4NH_3 + 4NO + O_2 \rightarrow 4N_2 + 6H_2O \quad \text{Equation 4}$$

$$2NH_3 + NO + NO_2 \rightarrow 2N_2 + 3H_2O$$

$$8NH_3 + 6NO_2 \rightarrow 7N_2 + 12H_2O$$

Hereinafter, operations of the apparatus for purifying exhaust gas according to various embodiments of the present invention will be described in detail.

Figure 2:
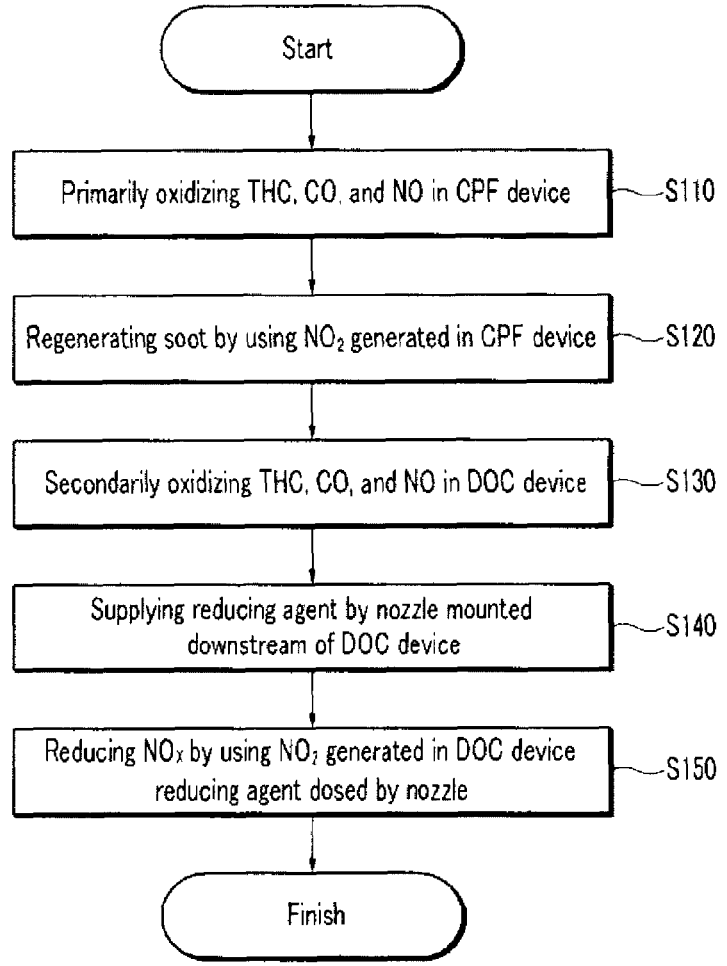
FIG. 2 is a flowchart showing processes performed by an exemplary apparatus for purifying exhaust gas according to the present invention.

FIG. 2 is a flowchart showing processes performed by an apparatus for purifying exhaust gas according to various embodiments of the present invention.

As shown in FIG. 2, the exhaust gas burned in the engine 10 and passing through the turbo charger 20 flows into the CPF device 30, and the CPF device 30 primarily oxidizes the HC, the CO, and the NO in the exhaust gas at step S110.

In addition, the CPF device 30 regenerates the soot by using the $NO_2$ contained in the primarily oxidized exhaust gas at step S120.

The exhaust gas that is primarily oxidized in the CPF device 30 is transmitted to the DOC device 40 through the exhaust pipe 70, and the DOC device 40 secondarily oxidizes the HC, the CO, and the NO contained in the exhaust gas at step S130. The loading amount of the noble metal and the ratio of the platinum to the palladium in the DOC device 40 are set so as to sufficiently supply the $NO_2$ to the SCR device 60.

After that, the nozzle 50 doses the reducing agent at step S140 into the exhaust gas that is secondarily oxidized, and the exhaust gas is transmitted to the SCR device 60.

The SCR device 60 reduces the $NO_x$ into the $N_2$ by using the $NO_2$ generated in the DOC device 40 and the reducing agent dosed by the nozzle 50 at step S150.

Experiments have been performed regarding three cases having different loading amounts of the noble metal and ratio of the platinum to the palladium in the first DOC and the second DOC, and the loading amounts of the noble metal and the ratio of the platinum to the palladium in the first DOC and the second DOC are described in the following Table 1 fore each case. Here, volumes of the CPF device 30, the DOC device 40, and the SCR device 60 for a 3 l engine are 3.5 l, 1.3 l, and 5 l, respectively.

TABLE 1

|  | Case 1 | Case 2 | Case 3 |
|---|---|---|---|
| First DOC | 50 g/ft³(Pt/Pd = 6/1) | 35 g/ft³(Pt/Pd = 2/1) | 55 g/ft³(Pt/Pd = 2/1) |
| Second DOC | 110 g/ft³(Pt/Pd = 2/1) | 140 g/ft³(Pt/Pd = 2/1) | 60 g/ft³(Pt/Pd = 1/0) |
| SCR | Fe-Zeolite | Fe-Zeolite | Fe-Zeolite |

Figure 4:
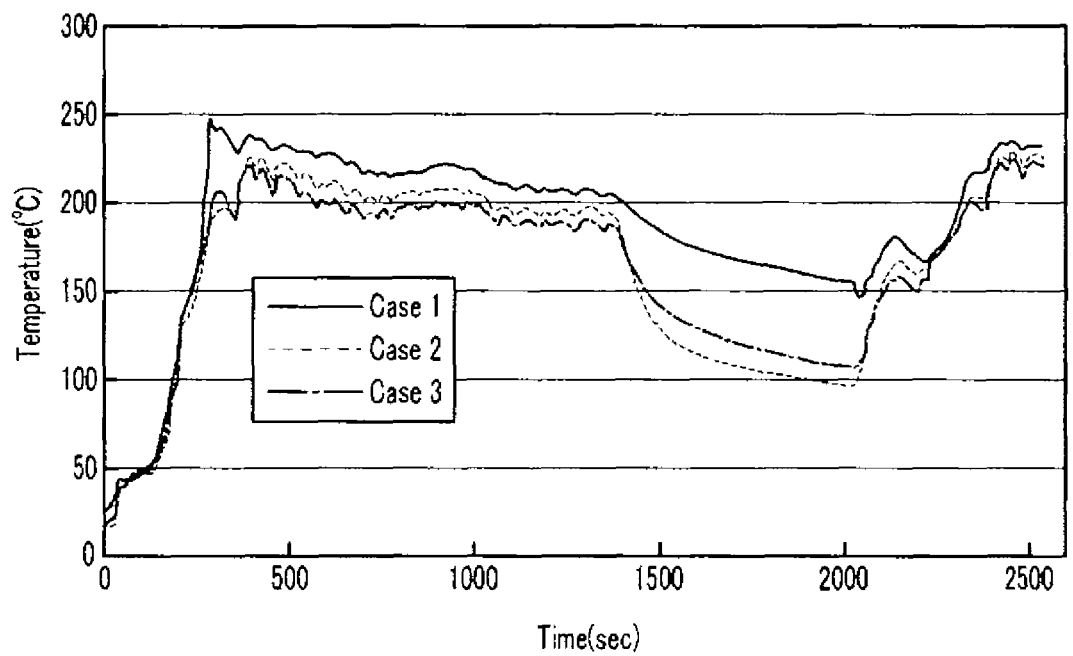
FIG. 4 is a graph showing temperature in a selective catalytic reduction device according to a lapse of time after beginning of operation of an exemplary apparatus for purifying exhaust gas according to the present invention.

Generally, the urea can be decomposed by heat at a temperature that is higher than or equal to 156° C., and the $NO_x$ can be stably reduced when the temperature in a front portion of the SCR device 60 is higher than or equal to 200° C. As shown in FIG. 4, time for maintaining 200° C. that is required for reducing $NO_x$ is longest in case 1 and is shortest in case 3. The time is described in Table 2.

TABLE 2

|  | Case 1 | Case 2 | Case 3 |
|---|---|---|---|
| Time for maintaining 200° C. (second) | 1371 | 923 | 348 |

In addition, purification efficiencies of the CO, the HC, and the $NO_x$ are described in Table 3.

TABLE 3

| List | | | Case 1 | Case 2 | Case 3 |
|---|---|---|---|---|---|
| CPF device + DOC device | $NO_2/NO_x$ ratio | Downstream of engine | 32% | 32% | 32% |
| | | Downstream of CPF device | 12% | 16% | 19% |
| | | Downstream of DOC device | 26% | 47% | 35% |
| | Slip amount of HC | | 6.3 g | 4.8 g | 2.5 g |
| SCR device | Time required for reaching 200° C. at front portion of SCR device (second) | | 285 | 363 | 296 |
| | Time for maintaining 200° C. (second) | | 1371 | 923 | 348 |
| | Absorption amount of HC | | 4.4 g | 4.0 g | 1.3 g |
| Purification efficiencies of CO/HC (%) | | | 75/85 | 75/87 | 83/89 |
| Purification efficiency of $NO_x$ (%) | | | 26 | 44 | 54 |

As shown in Table 3, temperature conditions and $NO_2/NO_x$ ratios in the SCR device in case 2 are better than those in case 3. However, the slip amount of the HC in the CPF device 30 and the DOC device 40 is large in case 2, and thus performance of the SCR device 60 is suppressed. Therefore, the purification efficiencies of the CO/HC and the purification efficiency of the $NO_x$ are best in case 3. In addition, since the loading amount of the noble metal is smallest in case 3, the manufacturing cost of the apparatus for purifying exhaust gas is also smallest in case 3.

Figure 5:
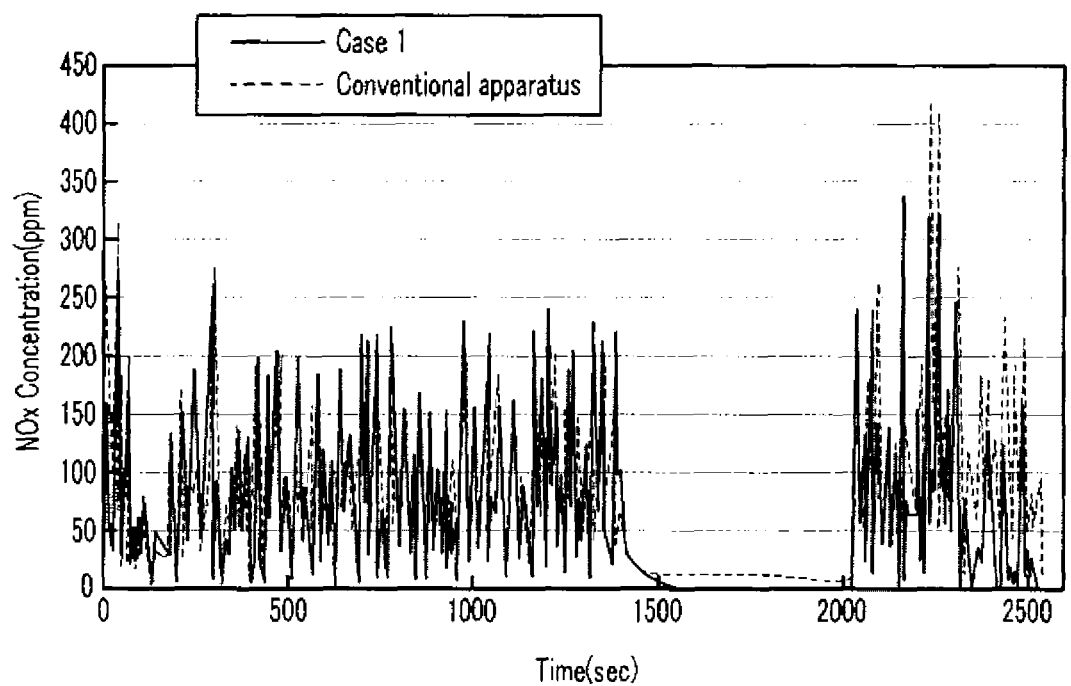
FIG. 5 is a graph showing exemplary purification efficiency of nitrogen oxide in case 1 according to the present invention.
Figure 6:
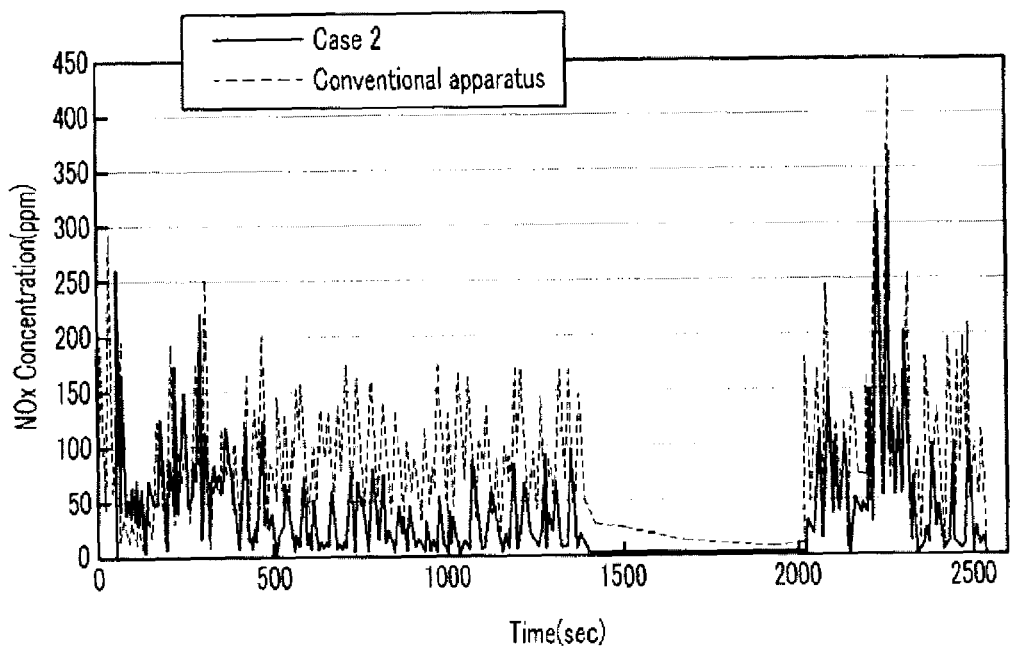
FIG. 6 is a graph showing exemplary purification efficiency of nitrogen oxide in case 2 according to the present invention.
Figure 7:
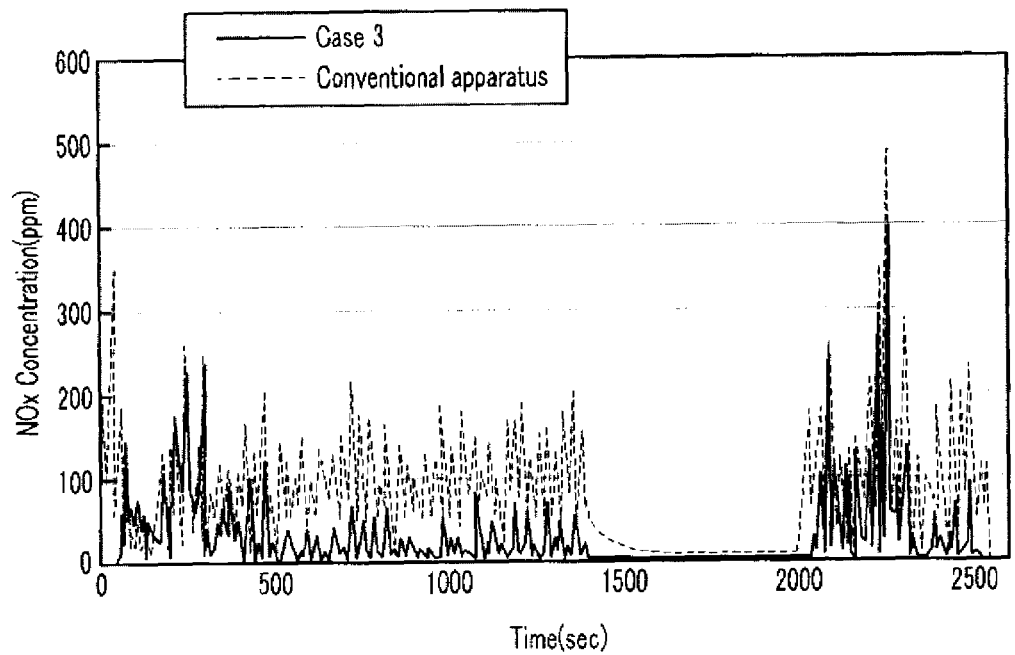
FIG. 7 is a graph showing exemplary purification efficiency of nitrogen oxide in case 3 according to the present invention.

FIG. 5 to FIG. 7 are graphs showing purification efficiency of the $NO_x$ in each case according to various embodiments of the present invention.

As shown in FIG. 5, the purification efficiency of the $NO_x$ in case 1 is slightly improved, compared with the conventional apparatus for purifying exhaust gas. As shown in FIG. 6 and FIG. 7, the purification efficiencies of the $NO_x$ in case 2 and case 3 are largely improved, compared with the conventional apparatus for purifying exhaust gas. Further, the purification efficiency of the $NO_x$ in case 3 is more improved than that in case 2.

As shown in the following Table 4, the ratio of the $NO_2/NO_x$ is appropriate and performance of the SCR device is guaranteed in a case in which the soot does not exist in the CPF device, but despite the rising exhaust temperature (rising 5° C.), the ratio of the $NO_2/NO_x$ decreases from 34.4% to 13.9% and thus the performance of the SCR devices decreases from 70% to 59.8% in a case in which the soot exists in the CPF device according to a conventional art.

As shown in the following Table 5, exhaust temperature rises by 10° C. at an outlet of the DOC device because of oxidation performance, and the ratio of the $NO_2/NO_x$ increases from 34.8% to 37.2% according to various embodiments of the present invention. Therefore, the ratio of the $NO_2/NO_x$ may be stably maintained or increased, and thus the performance of the SCR device increases from 63.5% to 69.7%. Table 4 and Table 5 are compared based on the same catalyst cost.

TABLE 4

Conventional art: DOC device (110 g/ft3, Pt/Pd = 2/1) + CPF device
(35 g/ft3, Pt/Pd = 6/1) + DM (nozzle) + SCR device

| Soot loading | Outlet of turbo charger $NO_2/NO_x$ | Outlet of DOC device | | | Outlet of SCR device | | |
|---|---|---|---|---|---|---|---|
| | | CO | HC | $NO_2/NO_x$ | CO | HC | $NO_x$ |
| w/o soot | 32 | 94.2 | 93.6 | 34.4 | 93.2 | 94.3 | 70.0 |
| w/soot (10 g/L) | 32 | 95.1 | 93.3 | 13.9 | 94.8 | 94.6 | 59.8 |

TABLE 5

Exemplary embodiments of the present invention: CPF device
(55 g/ft3, Pt/Pd = 2/1) + DOC device
(60 g/ft3, Pt/Pd = 1/0) + DM (nozzle) + SCR device

| Soot loading | Outlet of turbo charger $NO_2/NO_x$ | Outlet of DOC device | | | Outlet of SCR device | | |
|---|---|---|---|---|---|---|---|
| | | CO | HC | $NO_2/NO_x$ | CO | HC | $NO_x$ |
| w/o soot | 32 | 82.7 | 81.7 | 34.8 | 82.0 | 89.8 | 63.5 |
| w/soot (10 g/L) | 32 | 85.1 | 82.8 | 37.2 | 86.8 | 91.8 | 69.7 |

According to the present invention, $NO_2$ generated in a DOC device may be sufficiently supplied to an SCR device as a consequence of directly connecting the DOC device to the SCR device, and thus nitrogen oxide in exhaust gas may be sufficiently reduced.

Since HC and CO are primarily oxidized in a CPF device and are secondarily oxidized in the DOC device, the HC and the CO contained in the exhaust gas may be sufficiently removed.

Further, since the CPF device is disposed close to an engine, it may be easy to raise the temperature of the CPF device to a temperature (higher than 300° C.) that is required for regenerating soot.

For convenience in explanation and accurate definition in the appended claims, the terms "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for purifying exhaust gas, comprising:
a catalyzed particulate filter (CPF) device mounted downstream of an engine and including a first diesel oxidation catalyst (DOC) therein, the catalyzed particulate filter (CPF) device firstly oxidizing hydrocarbon (HC) and carbon monoxide (CO) in the exhaust gas by using the first diesel oxidation catalyst (DOC), and trapping and regenerating particulate material (PM) so as to increase nitrogen dioxide (NO2) required for soot regeneration;
a second diesel oxidation catalyst (DOC) device mounted downstream of the CPF device, secondarily oxidizing the HC and the CO in the firstly oxidized exhaust gas by using the second DOC, and oxidizing nitrogen monoxide (NO) into nitrogen dioxide (NO2) so as to increase amount of nitrogen dioxide (NO2) supplied to a selective catalytic reduction (SCR) device by using the second DOC;
a nozzle mounted downstream of the DOC device, and dosing a reducing agent to exhaust gas secondarily oxidized by the second DOC device; and
the selective catalytic reduction (SCR) device mounted downstream of the nozzle, and reducing nitrogen oxide (NOx) in the exhaust gas into nitrogen gas (N2) by using the NO2 generated in the second DOC device and the reducing agent;
wherein the first DOC comprises a noble metal;
wherein the noble metal of the first DOC comprises platinum (Pt) and palladium (Pd);
wherein a ratio of the platinum to the palladium in the first DOC is 2:1 to 12:1;
wherein the second DOC comprises a noble metal;
wherein the noble metal of the second DOC comprises platinum and palladium; and
wherein a ratio of the platinum to the palladium in the second DOC is 1:0 to 2:1.

2. The apparatus of claim 1, wherein the regeneration of the particulate material (PM) begins when a pressure difference between an inlet and an outlet of the CPF device is larger than or equal to a predetermined pressure.

3. The apparatus of claim 2, wherein the predetermined pressure is between 20 kpa and 30 kpa.

4. The apparatus of claim 1, wherein a loading amount of the noble metal in the first DOC is larger than or equal to 35 g/ft3.

5. The apparatus of claim 1, wherein a loading amount of the noble metal in the second DOC is between 10 g/ft3 and 100 g/ft3.

6. The apparatus of claim 1, wherein the first DOC oxidizes nitrogen monoxide (NO) into the nitrogen dioxide (NO2), and the oxidized nitrogen dioxide is used for regenerating the particulate material (PM).

7. The apparatus of claim 1, wherein the SCR device comprises a zeolite-catalyst where transition elements are ion-exchanged.

8. The apparatus of claim 7, wherein a weight ratio of the transition elements to the zeolite is 1:4.

9. The apparatus of claim 7, wherein the transition elements are copper or iron.

10. The apparatus of claim 1, wherein the CPF device comprises:
a first zone-coating portion in which 50-95 wt % of the first DOC is coated; and
a second zone-coating portion in which 5-50 wt % of the first DOC is coated.

11. The apparatus of claim 10, wherein length ratio of the first zone-coating portion to the second zone-coating portion is between 2:8 and 7:3.

12. The apparatus of claim 1, wherein the reducing agent is ammonia.

13. An engine comprising the apparatus for purifying exhaust gas as defined in claim 1.

* * * * *

UNITED STATES PATENT AND TRADEMARK OFFICE
CERTIFICATE OF CORRECTION

PATENT NO. : 8,402,754 B2
APPLICATION NO. : 12/276214
DATED : March 26, 2013
INVENTOR(S) : Chang Dae Kim et al.

It is certified that error appears in the above-identified patent and that said Letters Patent is hereby corrected as shown below:

On the Title Page:

Item (75) Inventors:

Change Second inventor "Jim Ha Lee" to --Jin Ha Lee--.

Signed and Sealed this
Twenty-eighth Day of May, 2013

Teresa Stanek Rea
*Acting Director of the United States Patent and Trademark Office*